United States Patent [19]

Balestra

[11] Patent Number: 5,022,911
[45] Date of Patent: Jun. 11, 1991

[54] GAS FIRED RADIANT HEATER FOR FURNACE FLOOR

[75] Inventor: Ben M. Balestra, Temperance, Mich.
[73] Assignee: Glasstech, Inc., Perrysburg, Ohio
[21] Appl. No.: 474,547
[22] Filed: Feb. 2, 1990
[51] Int. Cl.⁵ .............................................. C03B 27/04
[52] U.S. Cl. ........................................ 65/349; 65/356; 126/395; 431/353
[58] Field of Search ................ 65/286, 287, 356, 355, 65/349; 431/353; 126/39 J, 39 D; 432/212, 213

[56] References Cited

U.S. PATENT DOCUMENTS

| | | | |
|---|---|---|---|
| 346,621 | 8/1886 | Simpkins | 432/212 X |
| 355,568 | 1/1887 | Simpkins | 432/212 |
| 419,369 | 1/1890 | Simpkins | 432/212 X |
| 1,588,603 | 6/1926 | Mulholland | 65/349 |
| 1,630,162 | 5/1927 | Boucek et al. | 432/212 |
| 2,086,504 | 7/1937 | Kirkpatrick | 432/213 X |
| 2,105,004 | 1/1938 | Mortenson | 432/213 |
| 2,151,983 | 3/1939 | Merrill | 65/349 X |
| 3,579,983 | 5/1971 | Caruel et al. | 431/352 X |
| 3,816,061 | 6/1974 | Guth | 431/352 |
| 4,389,848 | 6/1983 | Markowski et al. | 431/352 X |

Primary Examiner—Robert L. Lindsay
Attorney, Agent, or Firm—Brooks & Kushman

[57] ABSTRACT

A radiant heater (12) is disclosed for heating a glass sheet heating furnace (10) and includes a base (40) having a horizontally extending heating passage (28) therein and a cover plate (42) mountable over said base (40). A horizontal flame burner (30) supplies a horizontal flame in heating passage (28) to heat radiant heater (12) and furnace (10) thereby.

20 Claims, 6 Drawing Sheets

GAS FIRED RADIANT HEATER FOR FURNACE FLOOR

TECHNICAL FIELD

This invention relates to furnaces for heating glass sheets on a roller conveyor in preparation for a processing operation such as tempering, bending, bending and tempering, et cetera.

BACKGROUND ART

Conventional glass sheet heating furnaces include roller conveyors on which glass sheets are heated while conveyed in a generally horizontal orientation through an associated heating chamber. Convection between both top and bottom surfaces of the conveyed glass sheets and the gas within the heating chamber performs a certain extent of the heating. Conduction between heated rolls of the conveyor and the bottom surface of each conveyed glass sheet also provides for the heating. In addition, the preferred construction of these furnaces utilize electric resistance elements both above and below the conveyor rolls such that both the top and bottom surfaces of the glass sheet are also heated by radiation.

Heating of glass sheets to a desired temperature for processing is most preferably performed as rapidly as possible to keep the furnace short to lower heat losses and so as to provide heating with as little distortion as can be achieved. The use of electric resistance elements requires high energy input to bring the furnace up to temperature, requires a long-time interval to effect upward temperature changes and requires high energy input to maintain a given temperature once that temperature is established.

DISCLOSURE OF INVENTION

An object of the present invention is to provide a glass sheet heating furnace which utilizes natural gas to perform the heating.

Another object of the invention is to provide a radiant heat source heated by combusted natural gas within the furnace.

A further object of the invention is to provide a burner that develops a horizontal flame for heating the radiant heat source.

In carrying out the above objects as well as other objects, a glass sheet heating furnace constructed in accordance with the present invention includes a housing defining a heating chamber and having a floor that defines the lower extremity of the heating chamber. The floor includes an upper surface that faces upwardly toward the heating chamber and a lower surface that faces downwardly. The floor includes a heating passage extending horizontally at a location between the upper and lower floor surfaces. A burner supplies a horizontal flame in the passage to heat the floor and thus the furnace.

In one embodiment of the invention, the passage is generally of a U-shape having an inlet opening and an exhaust opening with the U-shaped passage extending between the inlet opening and exhaust openings.

In the preferred embodiment of the invention, the passage is generally of a trident shape having a center and outside legs. Each leg includes an opening at a distal end. In one configuration of the preferred embodiment, the opening in the center leg defines an inlet opening and the openings in the outside legs define exhaust openings.

In another configuration of the preferred embodiment of the invention, the opening in the center leg is the exhaust opening and the openings in the outside legs are inlet openings.

In the preferred embodiment of the invention, the floor comprises a ceramic material. Therein, the floor is of a two-piece construction including a base that includes the heating passage above the lower floor surface and also a cover plate defining the upper floor surface. The cover plate is mountable over the base. Most preferably, the cover plate comprises a fused silica carbide material.

Preferably, the floor that defines the lower extremity of the heating chamber is defined by a plurality of the radiant heaters. Most preferably, two radiant heaters are cooperably mounted adjacent one another by ends opposite the exhaust ends to form a heater section. Therein, exhaust ends are distal and longitudinal with respect to the heating furnace.

Furthermore, the radiant heaters include a guide in communication with the exhaust openings to direct exhaust gases upwardly. A plurality of heater sections is mounted transversely in the heating furnace with respect to the other heating sections to form the furnace floor and the flame exhaust therein forms a vertically extending exhaust gas curtain at either end of the heater sections.

The burner supplying the horizontal flame includes a combustion air and fuel inlet located below the lower floor surface. The burner also includes a vertical intermediate portion extending upwardly from the inlet into the floor and a horizontally extending outlet defining a mixing and combustion chamber wherein the combustion air and fuel are mixed and ignited to propagate a horizontally extending flame. The burner is communicated with the heating passage whereby the flame is introduced into the heating passage to heat the furnace.

A first tube supplying combustion air defines the inlet, vertical intermediate portion and horizontally extending outlet. A second tube for supplying the fuel includes a distal end extending horizontally within the horizontally extending outlet of the burner for delivering combustion fuel. A mixer of a cup shape having a first orifice opening is mounted on the distal end of the second tube and meters the flow of combustion air. The distal end includes a second orifice opening for metering the flow of fuel whereby the same can be ignited to propagate the horizontal flame for heating beneath the furnace floor.

Preferably, the first and second orifice openings can be sized to operate at air fuel ratios from stoichiometric to 500% excess air. The openings can also be sized to operate to as much as a 20 to 1 turn down. Modest changes in the distal end second orifice allow utilization of a variety of gaseous fuels.

In an alternative arrangement of the burner, the second tube includes a first portion extending generally vertically through the middle portion of the first tube and a second portion in communication with and extending generally horizontally from the first portion and terminating into the distal end.

The objects, features and advantages of the present invention are readily apparent from the following detailed described of the best mode for carrying out the invention when taken in connection with the accompanying drawings.

BEST MODE FOR CARRYING OUT THE INVENTION

Figure 1:
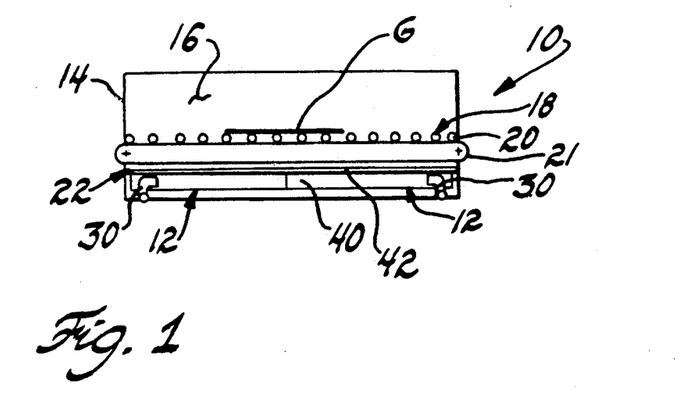
FIG. 1 is a schematic side elevational view of a glass sheet heating furnace that incorporates gas-fired radiant heaters and horizontal flame burners constructed in accordance with the present invention.

Referring to FIG. 1 of the drawings, a glass sheet heating furnace represented schematically is generally indicated by reference numeral 10 and is used for heating a glass sheet G for tempering, bending, bending and tempering, et cetera. Glass sheet heating furnace 10 includes gas-fired radiant heaters 12 constructed in accordance with the present invention. As is more fully hereinafter disclosed, gas-fired radiant heaters 12 replace the conventional electrical resistance element heaters to provide energy savings and more furnace flexibility.

Figure 2:
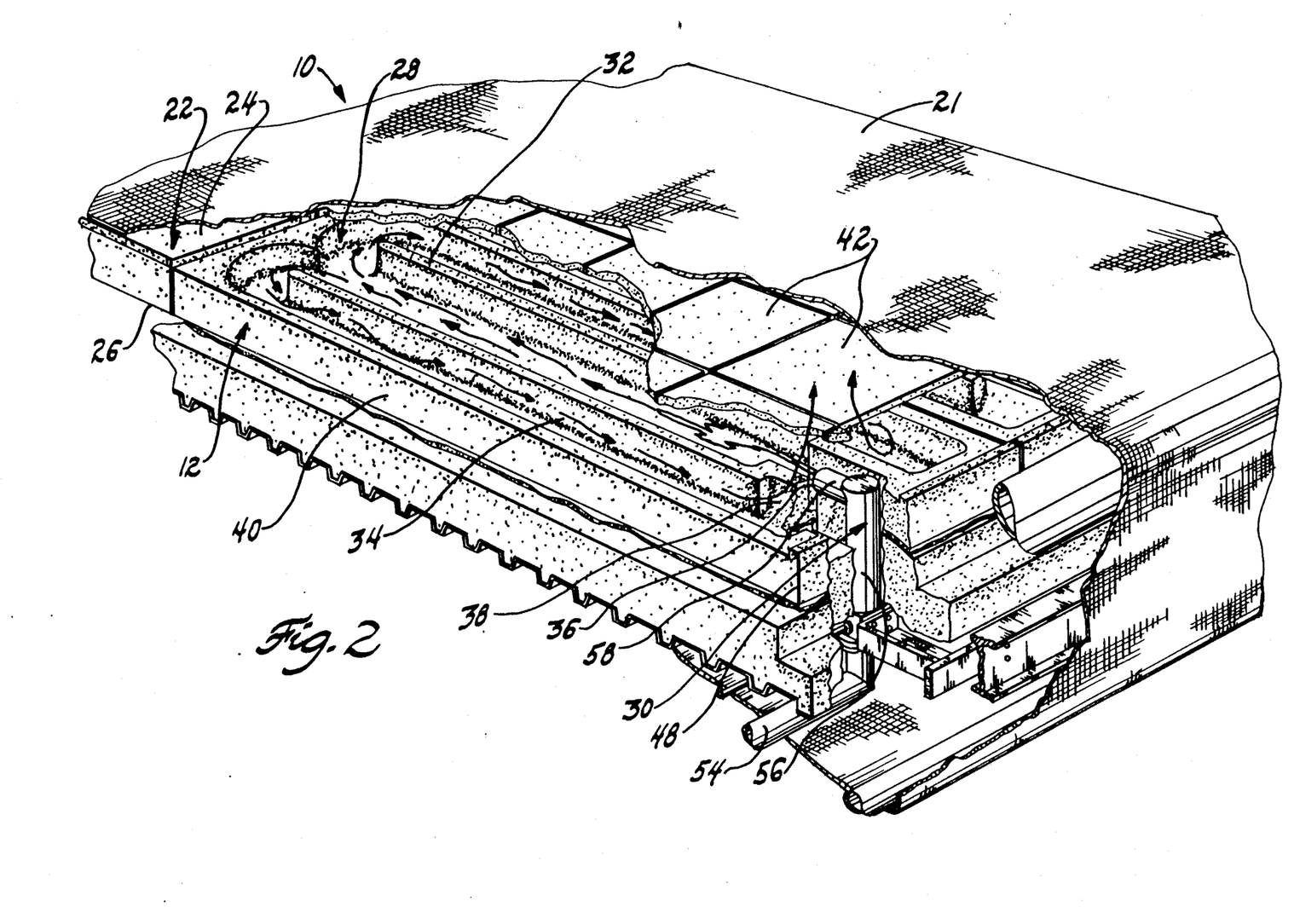
FIG. 2 is a sectional, perspective view of part of the glass sheet heating furnace illustrating a gas fired radiant heater and a horizontal flame burner.

Furnace 10, illustrated in FIGS. 1 and 2, includes a housing 14 defining a generally enclosed heating chamber 16 in which a glass sheet G is heated to a temperature suitable for further processing. A roller conveyor 18 of the furnace 10 includes horizontally extending rolls 20 for conveying glass sheet G through the heating chamber 16 for heating thereof from room temperature to a desired temperature for processing the glass sheet. A cullet conveyor 21 located below roller conveyor 18 catches any broken glass within the heating chamber 16.

A floor 22 defines the lower extremity of the heating chamber 16. Floor 22, which is best illustrated in FIG. 2, includes an upper surface 24 that faces upwardly toward the heating chamber 16 and a lower surface 26 that faces downwardly. The floor 22 includes a heating passage 28 extending horizontally at a location between the upper and lower floor surfaces 24,26. A burner 30 propagates a horizontally extending flame in passage 28 thereby heating furnace 10. Burner 30 is supplied a combustible fuel mixture from a source, not shown, external to heating chamber 16.

With further reference to FIG. 2 of the drawings, passage 28 is generally of a trident shape having a center leg 32 and outside legs 34. An inlet opening 36 wherein the horizontal flame is introduced for communication through said passage defines an opening in the center leg 32. Exhaust openings 38, wherethrough combustion gases are exhausted, define the openings in legs 34. Alternatively exhaust openings 38 can be used as inlet supply openings and opening 36 can be used as the exhaust opening. In this latter arrangement, the efficiency of the burner is somewhat reduced.

Preferably, floor 22 is of a two-piece construction having a base 40 that includes passage 18 and also a cover plate 42 which includes the upper surface 24 of floor 22. Cover plate 42 mounts on base 40 to define radiant heater 12. Preferably base 40 and cover plate 42 comprise a ceramic material that will withstand prolonged heating and high temperatures. Most preferably cover plate 42 comprises a fused silica carbide material which has excellent heat radiating properties.

Figure 3:
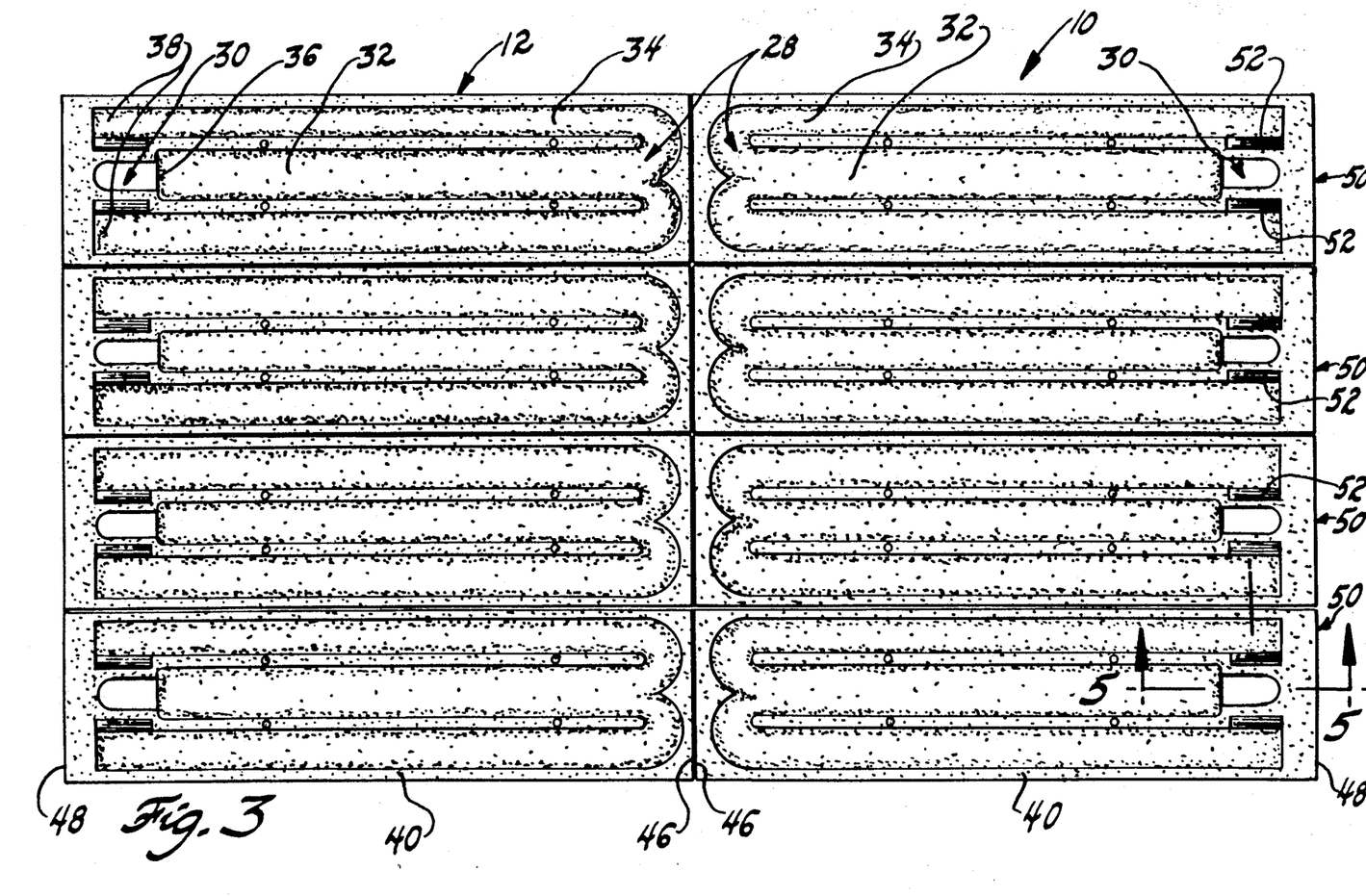
FIG. 3 is a plan view illustrating an array of the radiant heaters.

FIG. 3 of the drawings illustrates a preferred arrangement of the furnace floor 22 wherein a plurality of the radiant heaters 12, arranged in an array, defines the furnace floor 22. In this figure, each radiant heater 12 is shown with its cover plate 42 removed so that the pattern of passages 28 is readily apparent. As is illustrated, each passage 28 is generally of a trident shape.

In this preferred embodiment, two radiant heaters 12 are cooperably mounted adjacent one another by ends 46 opposite exhaust ends 48 to form a heater section 50. Exhaust ends 50 are thus distal and longitudinal with respect to heating furnace 10. Guides 52 configured into the legs 34 of passages 28 communicate exhaust gases upwardly. A plurality of heater sections 50 are mounted transversely in heating furnace 10 with respect to other heating sections. This arrangement of the heater sections 50 lines up the exhaust guides 52 transversely across furnace 10 to thereby provide two curtains of exhaust gases extending across the furnace. These curtains of exhaust air act as barriers to the influx of ambient air when the furnace 10 is charged with or discharges glass sheet G.

Figure 4:
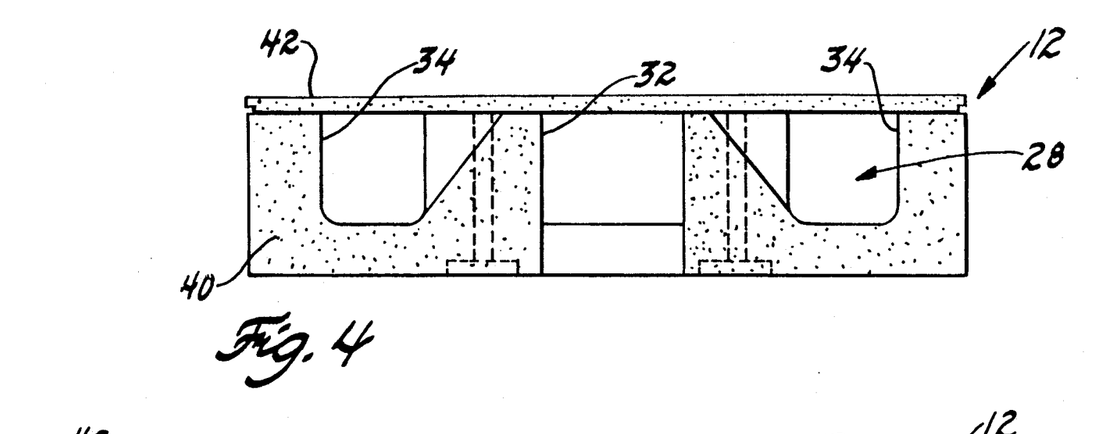
FIG. 4 is a sectional elevational view, taken along lines 4—4 in FIG. 3, illustrating a heating passage in the radiant heater.
Figure 5:
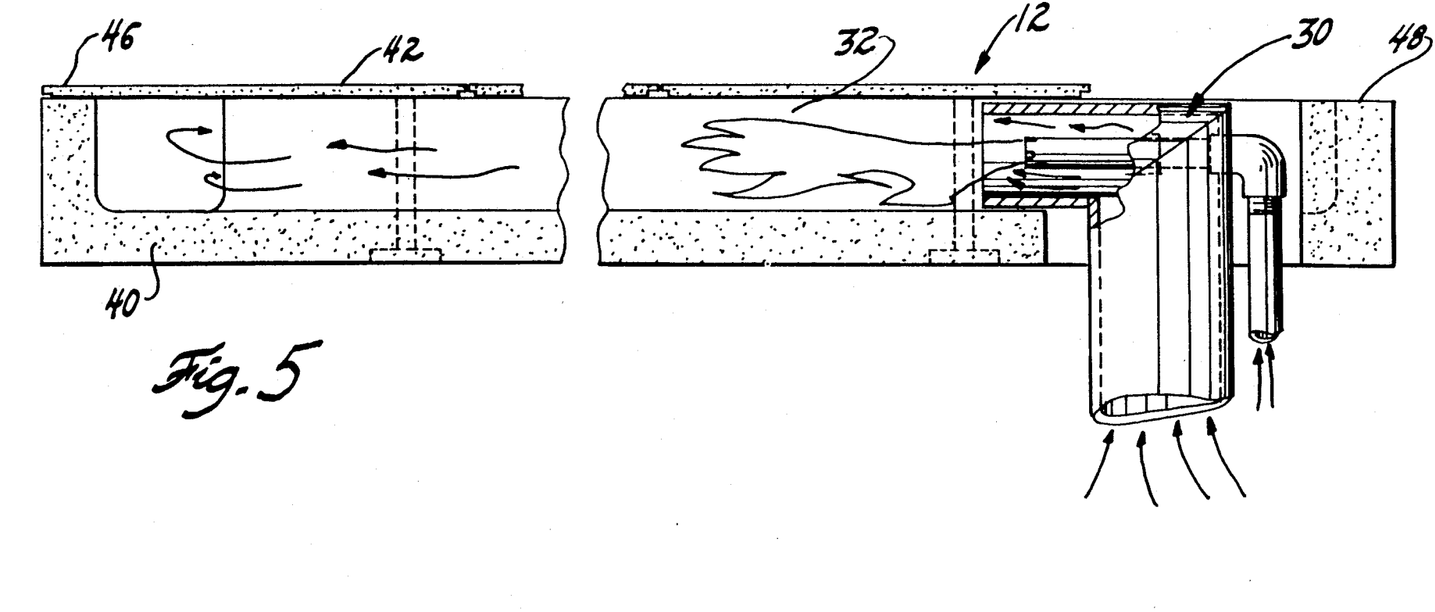
FIG. 5 is a sectional elevational view, taken along lines 5—5 in FIG. 3, illustrating the passage and the horizontal flame burner.

FIGS. 4 and 5 illustrate sections of the preferred radiant heater 12 shown in FIG. 3. FIG. 4 shows a cover plate 42 mounted on base 40 and the shape of passage 28. In FIG. 5, a burner 30 is shown mounted in base 40 to illustrate the propagation of a horizontal flame within center leg 32 of passage 28.

With reference to FIGS. 6 through 9, burner 30 includes a combustion air and fuel inlet 54 located below the lower floor surface 26. Burner 30 also includes a vertical intermediate portion 56 extending upwardly from the inlet 54 into the floor 22 and a horizontally extending outlet 58 defining a mixing and combustion chamber wherein the combustion air and fuel are mixed and ignited propagating a horizontally extending flame within the heating passage 28. This horizontally extending flame heats radiant heater 12 and thereby furnace 10.

Figure 6:
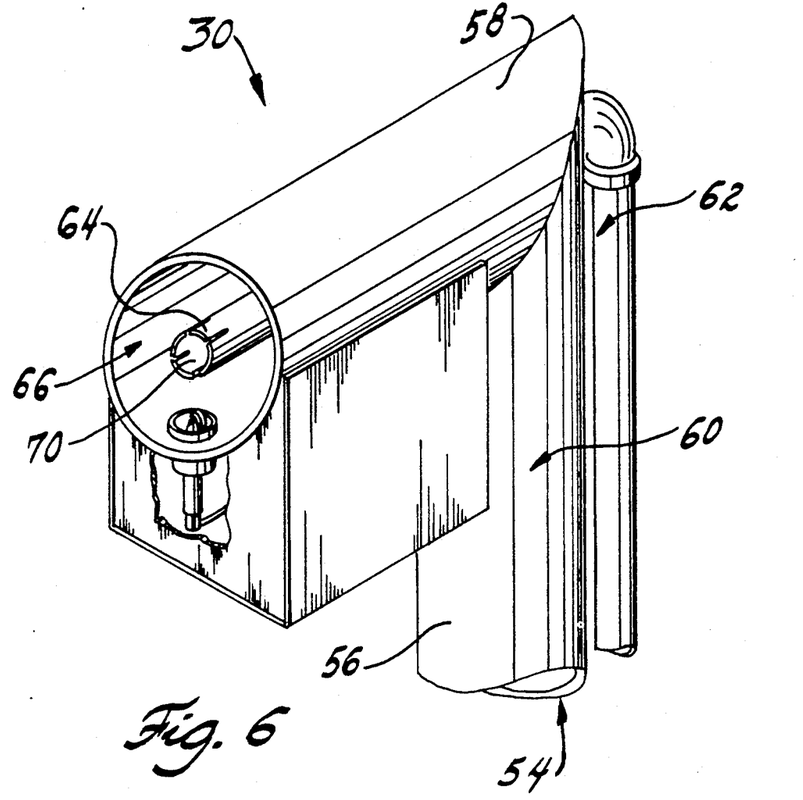
FIG. 6 is a perspective view of a burner constructed in accordance with the present invention.
Figure 7:
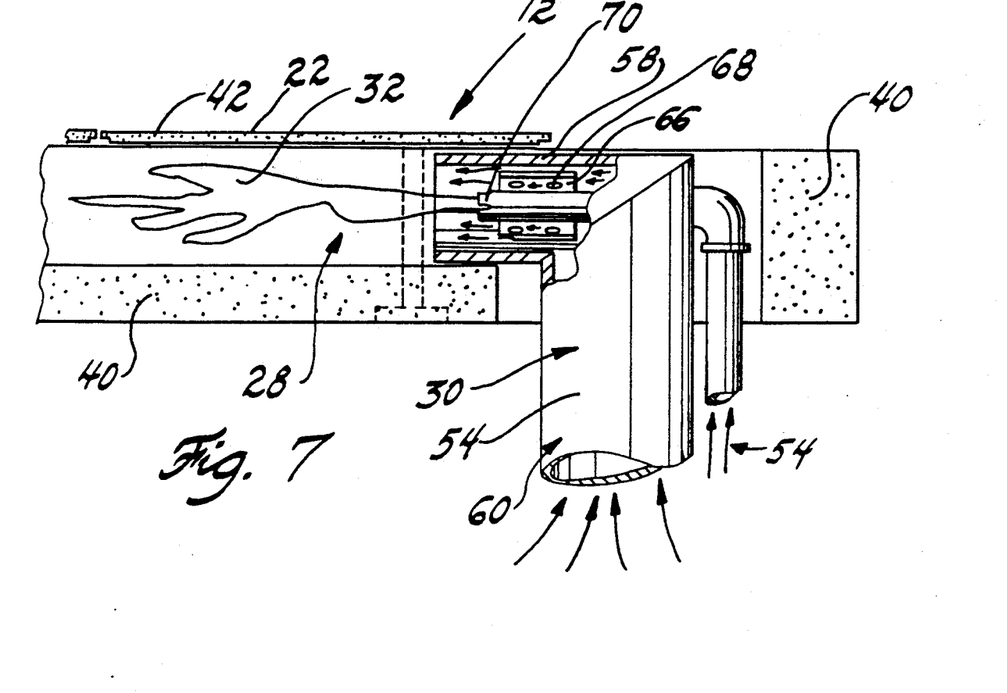
FIG. 7 is a sectional elevational view of the burner of FIG. 6.
Figure 8:
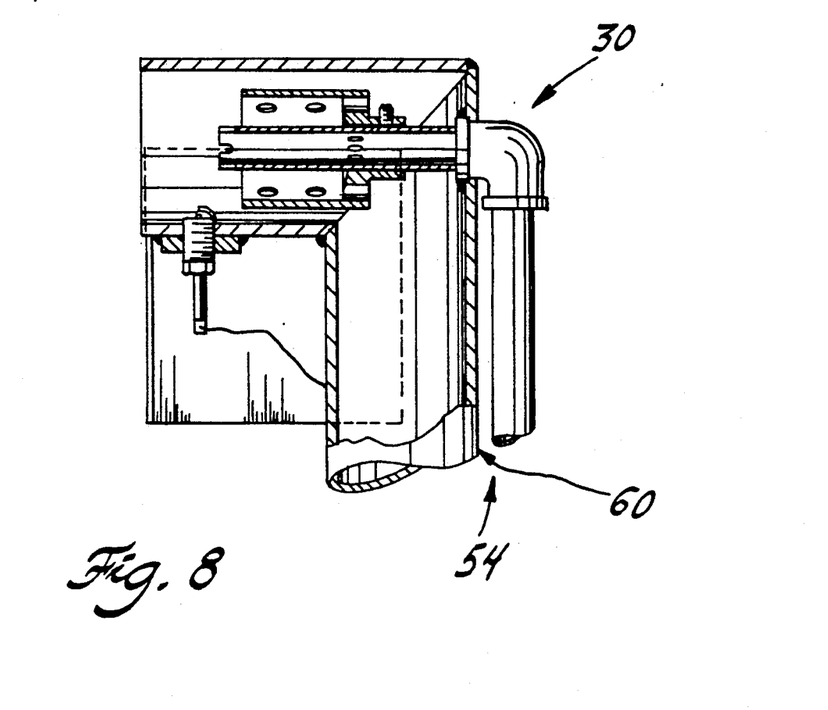
FIG. 8 is a partial sectional elevational view illustrating the relationship of the horizontal flame burner and the radiant heater.

FIGS. 6 and 7 illustrate one embodiment of burner 30. In this embodiment, a first tube 60 for supplying combustion air, defines the inlet 54, vertical intermediate portion 56 and horizontally extending outlet 58 of burner 30. A second tube 62 for supplying the fuel includes a distal end 64 extending horizontally within the horizontally extending outlet 58 of the burner 30 for delivering the fuel. A mixer 66 mounted on the distal end 64 of the second tube 62 mixes the combustion air and fuel whereby the same can be ignited to propagate the horizontal flame for heating within passage 28 beneath the upper surface 24 of floor 22.

Mixer 66 is of a cup shape having first orifice openings 68 therein for metering the flow of combustion air. Distal end 64 includes second orifice openings 70 for metering the flow of fuel. Preferably, first and second orifice openings 68,70 are sized to allow burner 30 to operate at air fuel ratios from stoichiometric to 500% excess air. Also first and second orifice openings 68,70 are sized to allow burner 30 to operate to as much as a 20 to 1 turn down. The sizing and modest changes therein of second orifice openings 70 in distal end 64 allows utilization of a wide variety of gaseous fuels.

Figure 9:
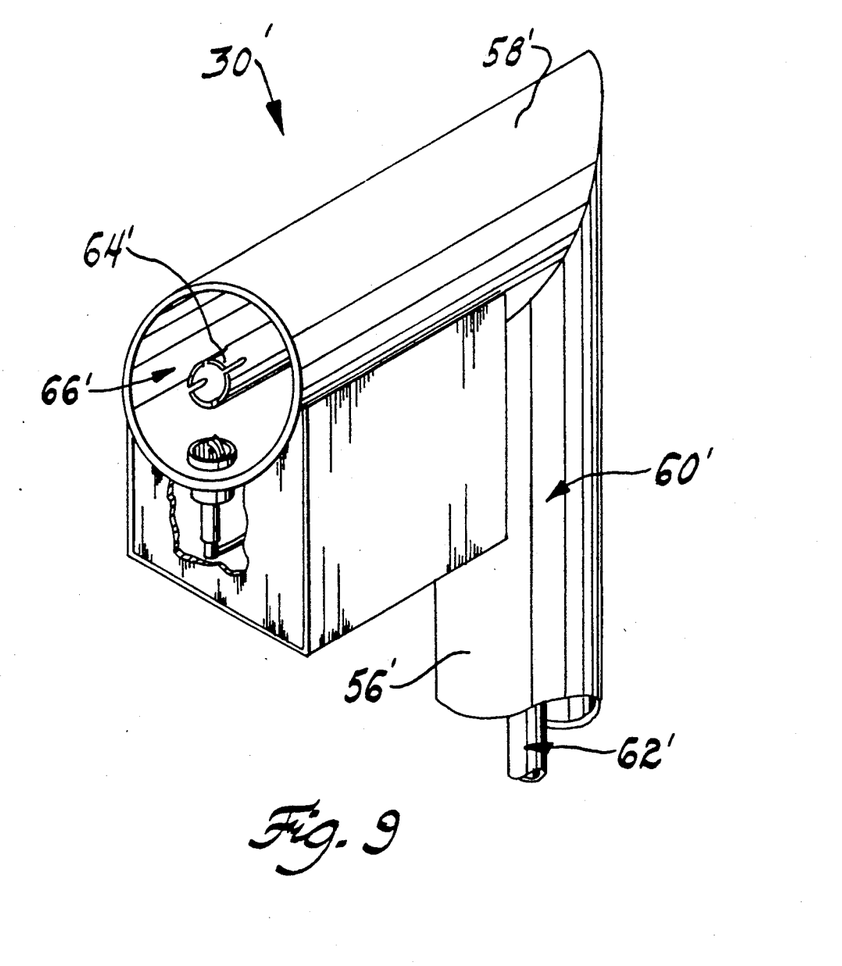
FIG. 9 is a sectional elevational view of an alternative embodiment of the burner constructed in accordance with the present invention.

In an alternative embodiment of the burner referenced as 30', shown in FIG. 9, the second tube 62' includes a first portion 68, extending generally vertically through the middle portion of the first tube 60' and a second portion 70' in communication with and extending generally horizontally from the first portion and terminating into the distal end 64'.

While the best mode for carrying out the invention has been described in detail, those familiar with the art to which this invention relates will recognize alternative ways of practicing this invention as defined by the following claims.

What is claimed is:

1. A glass sheet heating furnace comprising:
a housing defining a generally enclosed heating chamber and having a floor that defines the lower extremity of the heating chamber, said floor including an upper surface that faces upwardly toward the heating chamber and a lower surface that faces downwardly, and said floor including a heating passage extending horizontally at a location between the upper and lower floor surfaces; and a burner supplying a horizontal flame in said passage to heat the furnace.

2. A glass sheet heating furnace as in claim 1 wherein said passage is generally of a U-shape that defines an inlet opening and exhaust opening in said floor with a U-shaped passage therebetween.

3. A glass sheet heating furnace as in claim 1 wherein said passage is generally of a trident shape having a center and outside legs; each leg including an opening at a distal end.

4. A glass sheet heating furnace as in claim 3 wherein the center leg opening is an inlet opening and wherein the horizontal flame is introduced for communication through said passage and the openings in the outside legs are exhaust openings where combustion gases are exhausted.

5. A glass sheet heating furnace as in claim 3 wherein the outside leg openings are inlet openings wherein the horizontal flame is introduced for communication through said passage and the opening in the center leg is an exhaust opening where combustion gases are exhausted.

6. A glass sheet heating furnace as in claim 1 wherein said floor comprises a ceramic material.

7. A glass sheet heating furnace as in claim 6 wherein said floor is of a two-piece construction including a base that includes said passage above the lower surface and also a cover plate including the upper surface, said cover plate being mountable over said base.

8. A glass sheet heating furnace as in claim 7 wherein said cover plate comprises a fused silica carbide material.

9. A glass sheet heating furnace comprising:
a housing defining a generally enclosed heating chamber and having a floor that defines the lower extremity of the heating chamber; said floor being defined by a plurality of radiant heaters; each said radiant heater including an upper surface that faces upwardly toward the heating chamber and a lower surface that faces downwardly and a heating passage extending horizontally at a location between the upper and lower floor surfaces; and each said radiant heater including a burner supplying a horizontal flame in said passage to heat the furnace.

10. A glass sheet heating furnace as in claim 9 wherein said passage in each said heater is generally of a U-shape that defines an inlet opening and exhaust opening in said radiant heater with a U-shaped passageway therebetween whereby said flame is introduced into said inlet opening and communicated through said passage and after flowing through said passage is then exhausted out of said exhaust opening.

11. A glass sheet heating furnace as in claim 10 wherein both inlet and outlet openings are generally at the same said end of each said heater.

12. A glass sheet heating furnace as in claim 9 wherein said passage in each said heater is generally of a trident shape having a center and outside legs; each leg including an opening at a distal end.

13. A glass sheet heating furnace as in claim 12 wherein the center leg opening is an inlet opening and wherein the horizontal flame is introduced for communication through said passage and the openings in the outside legs are exhaust openings where combustion gases are exhausted.

14. A glass sheet heating furnace as in claim 13 wherein the outside leg openings are inlet openings wherein the horizontal flame is introduced for communication through said passage and the opening in the center leg is an exhaust opening where combustion gases are exhausted.

15. A glass sheet heating furnace as in claim 13 or claim 14 wherein two radiant heaters are cooperably mounted adjacent one another by ends opposite said exhaust ends to form a heater section, said exhaust ends being distal and longitudinal with respect to the heating furnace.

16. A glass sheet heating furnace as in claim 15 further including a guide in communication with said exhaust openings to direct exhaust gases upwardly.

17. A glass sheet heating furnace as in claim 15 including a plurality of heater sections mounted transversely in the heating furnace with respect to other heating sections, the flame exhaust forming a vertically extending curtain at either end of said heater sections.

18. A glass sheet heating furnace as in claim 9 wherein each said radiant heater is of a two piece construction including a base that includes said passage above the lower surface and also a cover plate including the upper surface, said cover plate being mountable over said base.

19. A glass sheet heating furnace as in claim 18 wherein said cover plate comprises a fused silica carbide material.

20. A glass sheet heating furnace comprising:
a housing defining a generally enclosed heating chamber and having a floor that defines the lower extremity of the heating chamber; said floor being defined by a plurality of radiant heaters; each said radiant heater including a base having a horizontally extending heating passage of a trident shape and a cover plate mountable over said base; and each said radiant heater including a burner supplying a horizontal flame in said passage to heat the furnace.

* * * * *

UNITED STATES PATENT AND TRADEMARK OFFICE
CERTIFICATE OF CORRECTION

PATENT NO. : 5,022,911

DATED : June 11, 1991

INVENTOR(S) : Ben M. Balestra

It is certified that error appears in the above-identified patent and that said Letters Patent is hereby corrected as shown below:

```
Column 3, Line 48 (Appln. Page 7, Line 14),
"!6" should be --16--.

Column 4, Line 7 (Appln. Page 8, Line 16),
"passage 18" should be --passage 28--.

Column 5, Line 11 (Appln. Page 11, Line 1),
"68," should be --68'--.
```

Signed and Sealed this

Thirteenth Day of October, 1992

Attest:

DOUGLAS B. COMER

Attesting Officer

Acting Commissioner of Patents and Trademarks